United States Patent
Cortez et al.

(10) Patent No.: US 6,193,266 B1
(45) Date of Patent: Feb. 27, 2001

(54) VOCATIONAL AIR RIDE TANDEM AXLE SUSPENSIONS

(76) Inventors: Jerome Cortez, 3027 N. Clifton Ave., Chicago, IL (US) 60657; Ashley Dudding, 5010 St. Andrews Dr., Plainfield, IL (US) 60544; Michael J. Cavanaugh, 7301 Sandalwood, Apt. #103, Tinley Park, IL (US) 60477; Richard J. Vogler, 2155 Countryside Circle, Naperville, IL (US) 60565

( * ) Notice: Subject to any disclaimer, the term of this patent is extended or adjusted under 35 U.S.C. 154(b) by 0 days.

(21) Appl. No.: 09/303,939

(22) Filed: May 3, 1999

(51) Int. Cl.⁷ ...................................................... B60G 5/02
(52) U.S. Cl. ............................................. 280/677; 280/678
(58) Field of Search ...................................... 280/677, 678, 280/683

(56) References Cited

U.S. PATENT DOCUMENTS

| | | | |
|---|---|---|---|
| 1,490,649 | 4/1924 | Vanderbeek . | |
| 3,162,465 | * 12/1964 | Vaugoyeau | 280/678 |
| 3,202,439 | * 8/1965 | Hickman | 280/677 |
| 3,493,243 | * 2/1970 | Butler | 280/678 |
| 3,520,548 | * 7/1970 | McGee | 280/678 |
| 4,108,470 | 8/1978 | Vinton | 280/677 |
| 4,429,898 | * 2/1984 | Bedenbender et al. | 280/678 |
| 5,016,905 | 5/1991 | Licari | 280/677 |
| 5,228,718 | 7/1993 | Koorstra | 280/678 |

* cited by examiner

Primary Examiner—Kenneth R. Rice
(74) Attorney, Agent, or Firm—Cook, Alex, McFarron, Manzo, Cummings & Mehler, Ltd.

(57) ABSTRACT

A vocational vehicle (i.e. truck or trailer intended for off-road operation) comprising a chassis mounted on a tandem axle suspension and having lateral stability in addition to roll and fore-and-aft stability. Roll and fore-and-aft stability are provided by a suspension sub-assembly comprising the stabilizer or cross tube of the suspension and a crank arm fixedly mounted on each end of the stabilizer tube with its distal end pivotally attached to the adjacent side of the chassis. Lateral stability is provided by a transverse torque rod interconnected between the rear axle and the chassis.

7 Claims, 4 Drawing Sheets

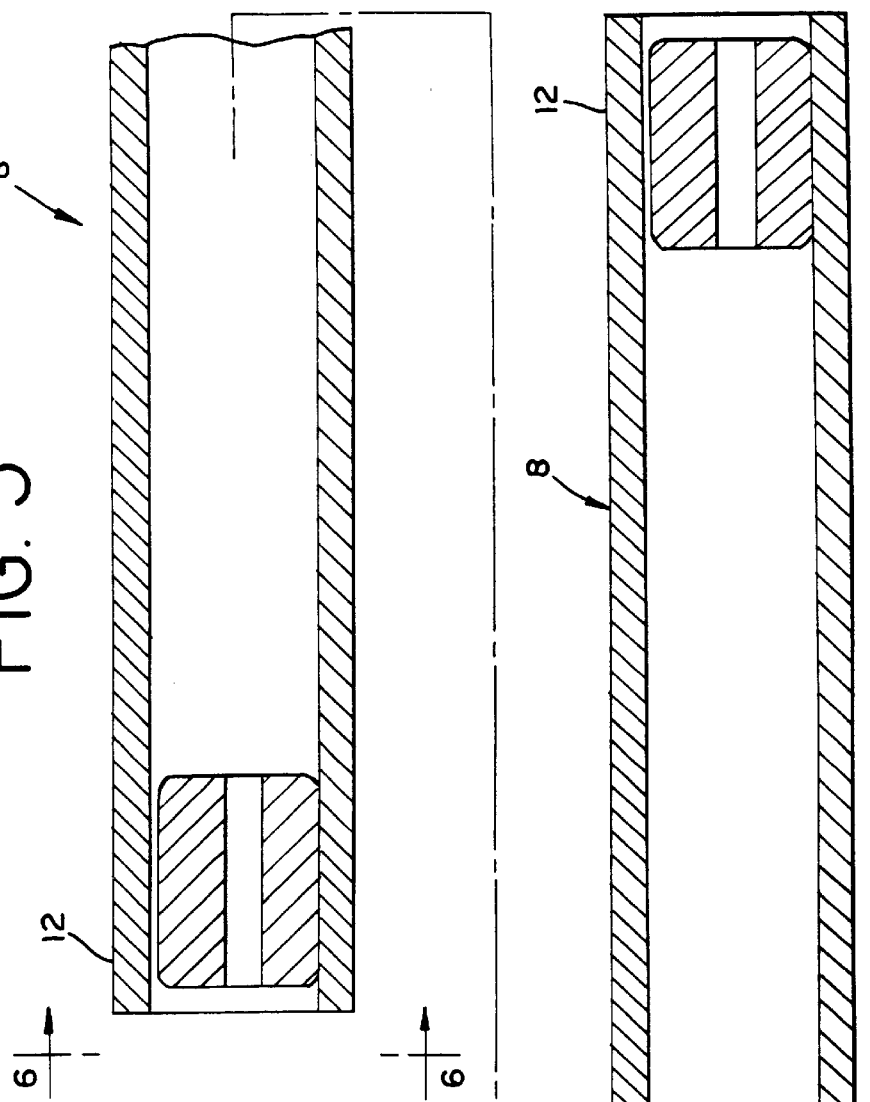
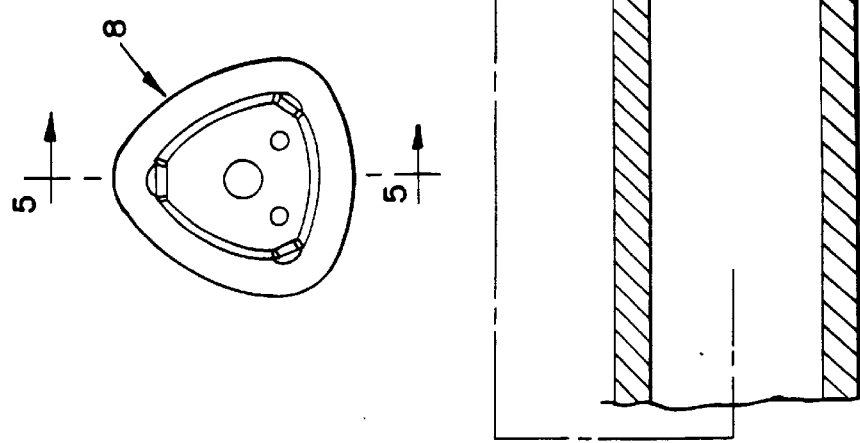

VOCATIONAL AIR RIDE TANDEM AXLE SUSPENSIONS

BACKGROUND OF THE INVENTION

This invention relates to so-called "vocational" heavy duty trucks and trailers adapted for various off-road jobs such as concrete mixer trucks, log-hauling trucks and other trucks which carry heavy loads and are required to operate over rough and uneven ground under off-road conditions. Such trucks must also be capable of on-road highway travel.

The suspensions of the type to which the present invention relate utilize tandem axles operatively interconnected by walking beams on opposite sides of the vehicle. At their opposite ends, the walking beams are pivotally connected to the ends of the axles with the walking beams interconnected by a transverse cross tube pivotally connected to the midpoints of the walking beams. A plurality of airbags are mounted in a novel arrangement on the tops of the walking beams directly beneath fore-and-aft extending chassis frame members in supporting relationship therewith. A torque rod is connected between the rear axle and the frame to resist lateral suspension forces as the vehicle is turning. Stabilizer features are incorporated in the suspensions in accordance with the present invention so as to provide roll stability, lateral stability, and fore-and-aft (longitudinal) stability for the associated vehicles with which these suspensions are used.

In view of the foregoing, it will be seen that the object of the invention, generally stated, is the provision of new and improved tandem axle suspensions for trucks intended for off road operation over rough ground conditions which utilize walking beams which interconnect tandem axles and which incorporate structures that provide roll stability, lateral stability and fore-and-aft stability.

A further object of the invention is the provision of air ride suspensions utilizing airbags or air springs which operate at or below approximately 100 pounds per square inch pressure and which provide on-site loading capabilities.

Other objects of the invention will be obvious to those skilled in the art and will be apparent hereinafter.

For a more complete understanding of the nature and scope of the invention, reference may be had to the following detailed description of a preferred embodiment thereof taken in connection with the accompanying drawings, wherein:

BRIEF DESCRIPTION OF THE DRAWINGS

FIG. 5 is a longitudinal view taken on line 5—5 of FIG. 6 of a stabilizer tube forming another element of the subassembly stabilizer structure; and FIG. 6 is an end elevational view taken on line 6—6 of FIG. 5.

Figure 1:
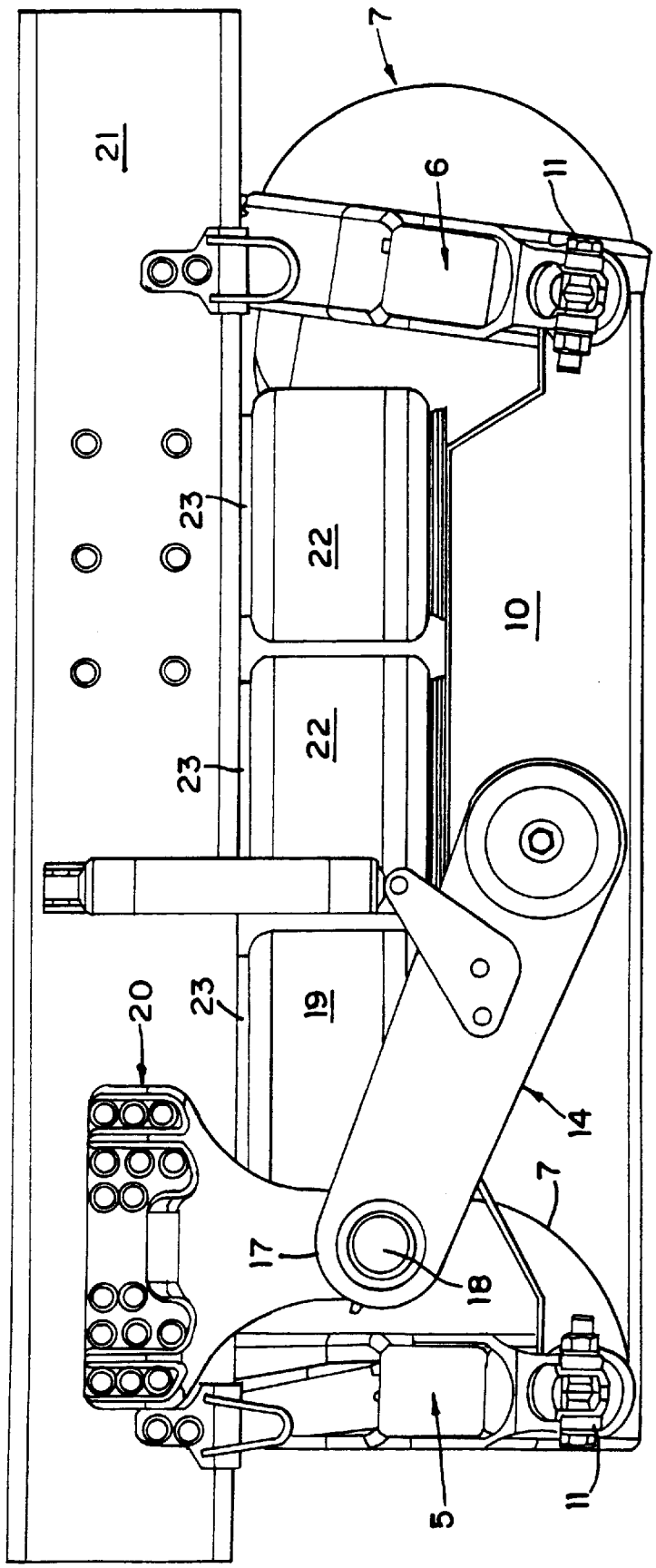
FIG. 1 is a side elevational view of a tandem axle suspension for a vocational truck or trailer utilizing airbags for providing air ride load support and incorporating a subassembly stabilizer structure which provides both roll stability and fore-and-aft stability, and a transverse torque rod positioned to provide lateral stability.
Figure 2:
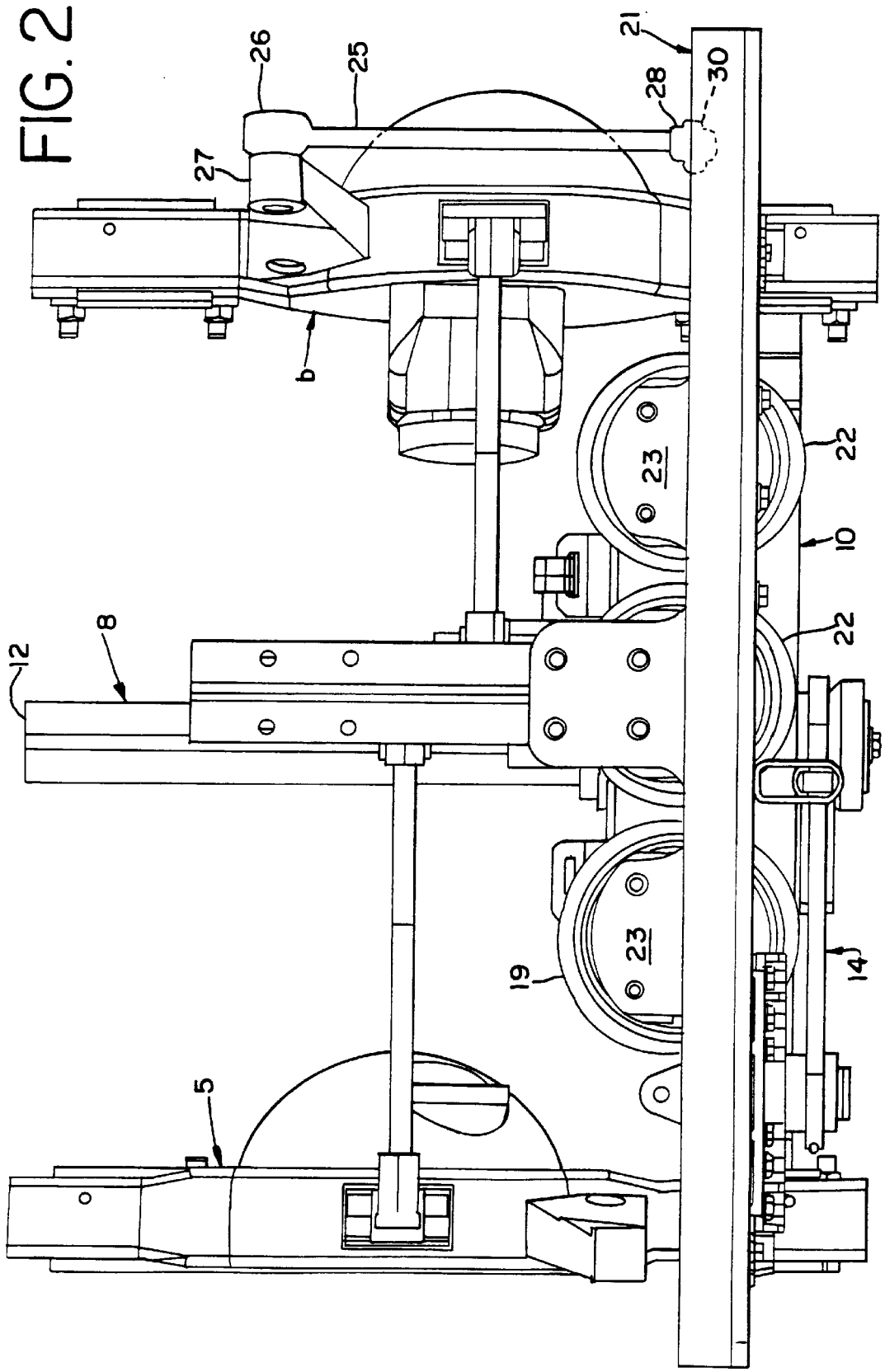
FIG. 2 is a top plan view of the suspension shown in FIG. 3 omitting parts on one side which are duplicated on both sides.

The tandem axle suspension shown in FIGS. 1 and 2 is conventional in that it comprises a front axle indicated generally at 5, a rear axle indicated generally at 6, front and rear ground wheels indicated generally at 7—7 mounted on the opposite ends of the axles 5 and 6, a stabilizer or cross tube indicated generally at 8 and a pair of walking beams indicated generally at 10—10. The opposite ends of the walking beams 10 are pivotally supported beneath the ends of the axles 5 and 6 by pivot attachment structures of known type indicated generally at 11—11. The details of such pivot assemblies and structures are shown and described, for example, in U.S. Pat. No. 4,699,399, dated Oct. 13, 1987 the disclosure of which is incorporated by reference herein.

Figure 4:
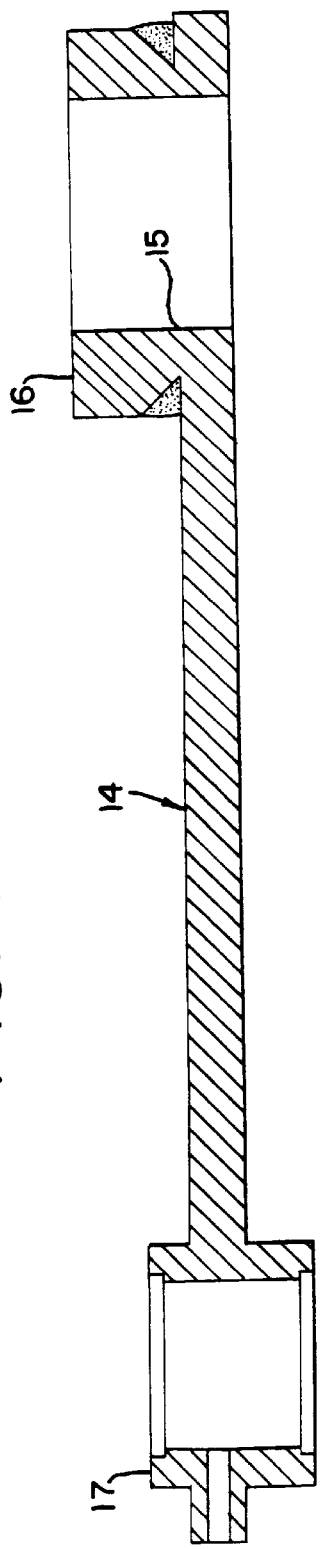
FIG. 4 is a longitudinal sectional view taken on line 4—4 of FIG. 3.
Figure 3:
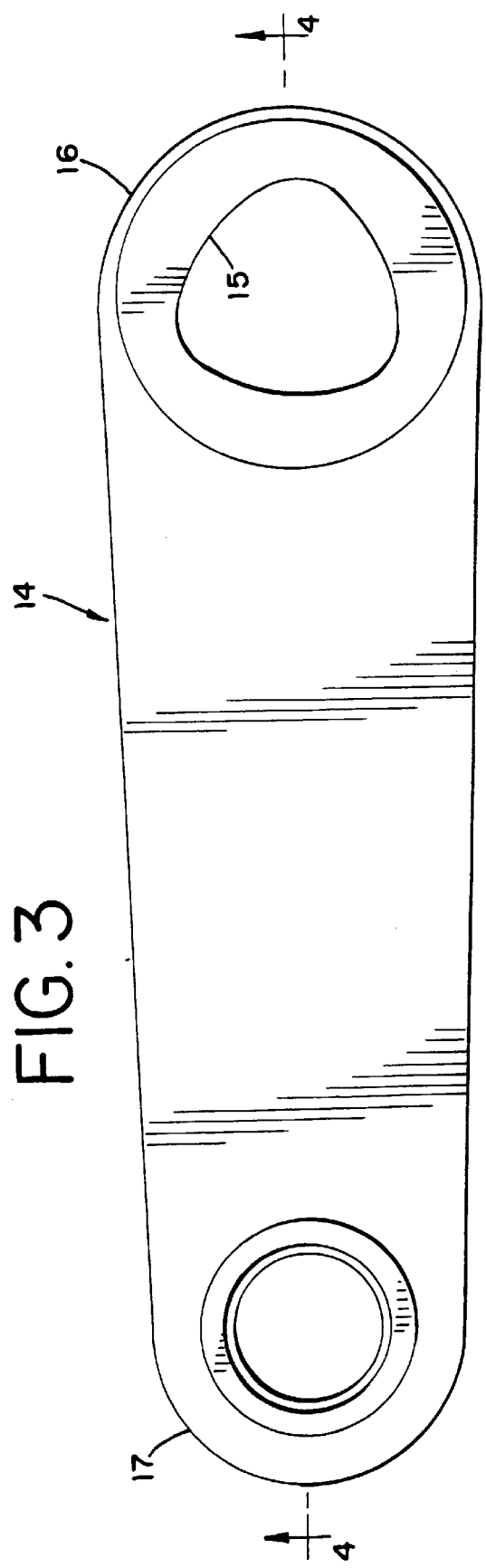
FIG. 3 is a side elevational view of a crank arm forming an element of the suspension subassembly stabilizer structure.

The ends of the stabilizer tube 8 extend in pivoted relationship through bushings at the midpoints of the tandem axles 10. The opposite ends 12—12 of the stabilizer tube 8 project from the outer sides of the walking beams 10. The stabilizer tube 8 is generally triangular in cross section in order for the protruding ends 12 to provide a fixed mating connection with a crankarm 14 on each side of the suspension. The interior 15 of the proximal end 16 (FIGS. 3 and 4) of each crank arm 14 is generally triangular in shape so as to fit in mating relationship with a triangular end 12 of the stabilizer or cross tube 8 thereby preventing any play between the crank arms 14 and the ends 12 of the stabilizer tube 8 on which the crank arms are operatively mounted.

Each installed crank arm 14 slants upwardly and forwardly as shown in FIG. 1 with its distal end 17 pivotally connected to a pin 18 projecting laterally from a hanger 20 mounted on the side of each one of the fore-and-aft side frame members 21 which form components of the chassis that is mounted on the suspension. The side frame members 21 are supported on the respective walking beams 10 by a front air spring or airbag 19 and a pair of rear air springs 22. The upper ends of the air bags 19 and 22 are connected to fittings 23—23 on the undersides of the respective frame members 21.

It will be noted from FIGS. 1 and 2 that while the air springs or airbags 19 and 22 are mounted at equal spacing with respect to each other on the tops of the walking beams 10, they are not symmetrically located with respect to either the stabilizer tube 8 or the midpoints of the walking beams 10. Instead, the center or middle air spring 22 is positioned appreciably to the rear of the midpoint of the walking beam 10 and rearwardly with respect to the stabilizer tube 8. This non-symmetrical mounting arrangement provides clearance for the frame hangers 20 and is compensated for by employing a front air spring 19 which is larger than the smaller rear air springs 22.

With the distal ends of the crankarms 14 being pivotally connected at pins 18 to the brackets 20 and with their proximal ends rigidly mounted on opposite ends of the cross tubes 8 it will be seen that roll stability is provided for the vehicle. Likewise, this stabilizer subassembly also provides for fore-and-aft (i.e. longitudinal) stability for the vehicle including resistance to braking and accelerating forces.

In order to also provide lateral stability a transverse torque rod 25 (FIG. 2) is pivotally mounted at one end 26 on a fixture 27 on the top of the rear axle 6 and pivotally connected at the opposite end 28 to a bushing 30 mounted on a chassis beam 21. Lateral forces applied to the rearmost tires in the tandem suspension are transmitted from the rear axle 6 directly to the vehicle frame by the torque rod 25. Since the rear of the frame member 21 is attached to the axle 6 the rear of the beam 21 is relatively fixed with respect to the vehicle frame in the lateral direction.

The front axle 5 has no torque rod. Hence lateral forces are transmitted from the axle to a beam 10 the front of which is allowed to shift or translate a discrete amount in the direction of the applied lateral force until the beam center becomes sufficiently mis-aligned with its inner bushing and binding occurs. Thereupon translation ceases and lateral forces are transmitted from the front axle to the beam, to the stabilizer tube, then finally reacted by the vehicle frame. The advantages of this system of lateral fixation are twofold:

First, if a torque rod was mounted to the front axle 5, during high beam articulation the translation caused by both front and rear transverse torque rods would cause a beam 10 to bind about its center bearing prematurely because the lateral fixation would be "overdefined", i.e. there would be three lateral fixation points instead of two. However, with only a rear transverse torque rod a beam 10 can articulate to a greater displacement and accommodate greater obstacles in the terrain.

Second, because the front of a beam 10 translates laterally in the direction of the inside of the vehicle turning circle, the resulting tire steering angles of the tandem axles will be toward the inside of the turning circle, increasing proportionally with increasing lateral force, and imposing a rotational moment on the chassis opposite that of the steering input, and thus tending to self-correct deviations from a straight vehicle path. This lateral force compliance understeer is a desirable condition, promoting stable and predictable vehicle handling and control.

Those skilled in the art will understand that certain changes may be made in the suspension without departing from the scope of the invention as defined in the claims. For example, instead of the stabilizer tube 8 having a generally triangular shape and the crank arms having matingly shaped sockets, other shapes can be employed such as square or hexagonal. Likewise, the protruding ends 12 of the stabilizer tube 8 could be axially splined and the sockets of proximal ends 16 of the crank arms matingly splined.

What is claimed is:

1. In a tandem axle suspension for a vehicle chassis which includes fore-and-aft extending chassis side frame members, said suspension having fore-and-aft spaced axles with ground wheels mounted on opposite ends of the axles, a fore-and-aft extending walking beam extending between the ends of the axles on each side of the suspension and pivotally supported at its opposite ends by adjacent ends of the axles, and a stabilizer tube extending between the midpoints of said walking beams in pivoted relationship therewith, the improvement providing combined vehicle roll and fore-and-aft stabilization comprising, a plurality of air springs mounted on each of said walking beams in chassis supporting relationship with one of said fore-and-aft extending chassis side frame members, a crank arm on each side of said suspension fixedly secured at its proximal end to the adjacent end of said stabilizer tube and pivotally connected at its distal end to a fixed support on a chassis side frame member at a location forward of said stabilizer tube and above the front axle whereby each said crank arm is upwardly and forwardly inclined, said crank arms in co-action with said stabilizer tube providing both roll and fore-and-aft stability to a vehicle comprising said vehicle chassis and said suspension.

2. In the improvement in the tandem axle suspension of claim 1, the ends of said stabilizer tube project on the outer sides of said walking beams and said proximal ends of said crank arms are fixedly secured to said projecting ends for rotational movement therewith.

3. In the improvement of claim 2, said stabilizer tube projecting ends being exteriorly shaped to mate in fixed relationship with said proximal ends of said crank arms.

4. In the improvement of claim 3, said projecting ends of said stabilizer tube having a generally triangular exterior shape.

5. In the improvement in the tandem axle suspension of claim 1, said plurality of air springs providing the complete support of said vehicle chassis on said suspension and said air springs being unsymmetrically disposed on said walking beams with respect to said stabilizer tube.

6. In the improvement of claim 5, three equi-spaced air springs constitute said plurality with the middle air spring being disposed over said cross tube with its center located rearwardly of the center of said cross tube.

7. The improvement of claim 1 comprising a transverse torque rod pivotally connected at one end to said aft axle and pivotally connected at its opposite end to said chassis so as to provide lateral stability to said vehicle.

* * * * *